June 16, 1936.   R. C. NEWHOUSE   2,044,734
APPARATUS FOR STRESS RELIEVING WELDED JOINTS
Filed May 23, 1932
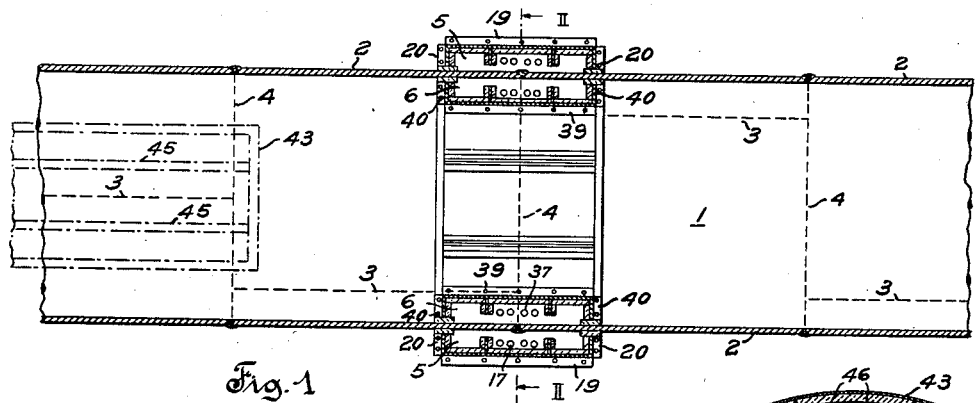
Fig. 1
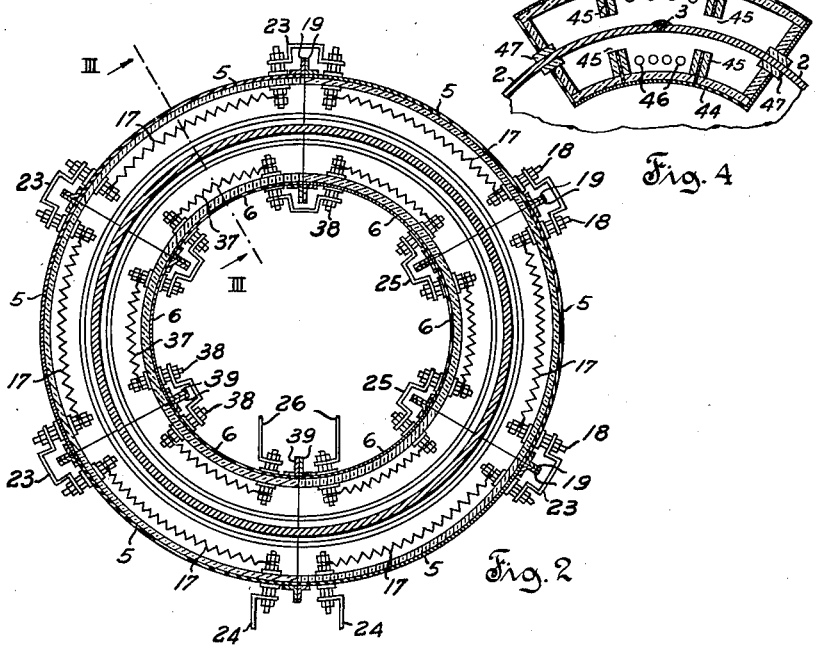
Fig. 4
Fig. 2
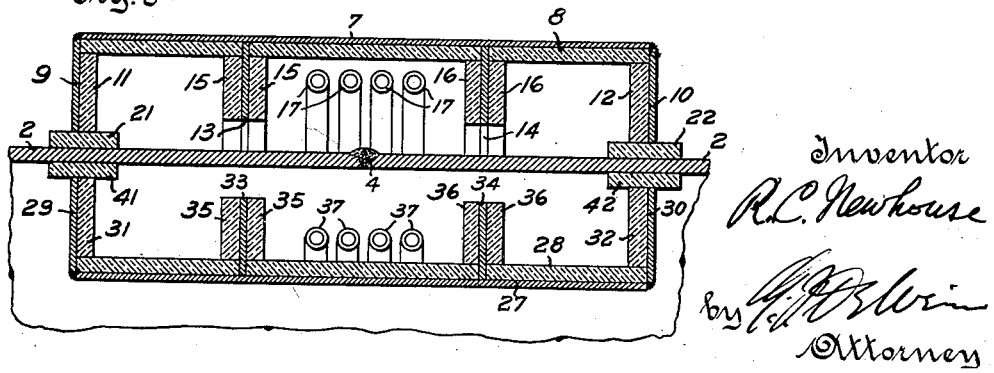
Fig. 3
Inventor
R. C. Newhouse
by [signature]
Attorney Patented June 16, 1936

2,044,734

UNITED STATES PATENT OFFICE 2,044,734

APPARATUS FOR STRESS RELIEVING WELDED JOINTS

Ray C. Newhouse, Wauwatosa, Wis., assignor to Allis-Chalmers Manufacturing Company, Milwaukee, Wis., a corporation of Delaware Application May 23, 1932, Serial No. 613,018

15 Claims. (Cl. 266—5)

This invention relates generally to the art of heat treating articles and it relates more specifically to an improved apparatus for stress relieving welded joints. Subject matter disclosed but not specifically claimed herein is claimed in an application of the present inventor, Serial No. 498, Method of stress relieving welded joints, filed January 5, 1935.

It is an object of the invention to provide an efficient and inexpensive apparatus for stress relieving welded joints on metal structures of large dimensions.

Another object of the invention is to provide an apparatus for stress relieving welded joints on metal structures of large dimensions, which apparatus is considerably smaller and cheaper than a large furnace of sufficient capacity to receive and heat the entire metal structure.

Another object of the invention is to provide an apparatus for stress relieving welded joints on metal structures of large dimensions, which apparatus may readily be employed at the place where the metal structure is to be erected or assembled, that is, outside of its place of manufacture.

A more specific object of the invention is to provide an efficient and inexpensive apparatus for stress relieving welded joints on plate metal vessels and other plate metal structures of large dimensions, such as cylindrical shells for grinding mills, kilns and other machines, boilers, penstocks and the like.

A further object of the invention is to provide an apparatus for locally heat treating welded structures of large dimensions at that portion thereof where a welded joint occurs, and to incorporate in said apparatus means for causing a gradual decrease of temperature from the heated joint to the adjacent portions of the structure.

These and other objects and advantages of the invention will be apparent from the following description. A clear conception of an embodiment of the invention and of a preferred manner in which the invention may be carried out, may be had by referring to the drawing accompanying and forming a part of this specification, in which like reference characters designate the same or similar parts in the several views.

Fig. 1 is a vertical longitudinal section through a cylindrical shell of a rotary kiln or the like, with an apparatus for stress relieving a circumferential joint applied thereto.

Fig. 2 is an enlarged section on line II—II of Fig. 1.

Fig. 3 is an enlarged section on line III—III of Fig. 2.

Fig. 4 is a vertical transverse section through a furnace of modified construction for stress relieving longitudinal joints.

The numeral I indicates generally the cylindrical shell of a rotary kiln or like structure which is made in sections, each section consisting of a steel plate 2 rolled into cylindrical shape and having its ends connected together by a longitudinal welded joint 3. Adjoining sections of the cylindrical shell are connected together by welded circumferential joints 4. A portion of the shell I, where a circumferential joint occurs, is surrounded exteriorly by a ring shaped casing comprising six sections 5; and another ring shaped casing comprising six sections 6 is placed, concentric with the outer casing, interiorly of the shell so as to cover the welded joint and the adjacent portions of the cylindrical shell sections between which the welded joint occurs.

Each section 5 of the outer casing has a curved top wall and side walls spaced in the direction of the axis of the shell and extending in planes at right angles thereto. The top wall is formed of a sheet metal facing 7 and a lining 8 of heat insulating material, such as asbestos. The side walls are constructed similarly of sheet metal facings 9 and 10 and linings 11 and 12 of heat insulating material. The sheet metal facings of the top and side walls are secured together, as by welding, and they form a frame, so to speak, for supporting the heat insulating material which is secured thereto. Sheet metal members 13 and 14 somewhat similar to the sheet metal facings 9 and 10 of the side walls are secured to the inner surface of the sheet metal facing 7, for instance by welding, and linings 15 and 16 of heat insulating material are secured thereto in any suitable manner. The sheet metal members 13 and 14 and the heat insulating linings 15 and 16 secured thereto do not extend down to the surface of the cylindrical shell. They are intended to serve as baffles dividing the interior space of each ring section 5 into a central zone adjacent to the welded joint and lateral zones in communication with the central zone. Arranged in the central zone and supported by the top wall of the casing section 5 are four heating elements in the form of electric resistance coils 17 from which heat is transmitted to the welded joint by radiation. The ends of the coils 17 are clamped to terminal studs 18 carried by the ring sections 5, the terminal studs projecting through the top wall of the ring section in order to facilitate the making of electrical connections.

Secured to the sheet metal facing 7 of each ring section 5 are flanges 19, one at each end of the section, which flanges permit adjacent ring sections to be rigidly secured together. Similar flanges 20 are secured to the sheet metal facings 9 and 10 of the side walls. The flanges are suitably drilled for receiving through bolts which may hold the sections securely together. When all six ring sections of the outer casing are securely clamped together by means of their flanges 19 and 20, a rigid ring shaped structure of a given inside diameter is obtained, said inside diameter being determined by the distance between diametrically opposed points on the inner edge of the ring formed by the circularly arranged side walls 9 or 10 of the casing sections 5. This inside diameter of the outer casing is preferably somewhat larger than the outside diameter of the cylindrical shell to which the casing is to be applied, and spacers 21 and 22 of heat insulating material are provided to fill the gaps between the outer surface of the cylindrical shell and the side walls of the casing sections 5. By means of the spacers an outer ring shaped casing of fixed inside diameter may be accommodated to cylindrical shells of different diameters as the thickness of the spacers may vary to a considerable extent. Thus, for instance, if the outside diameter of the shell is only slightly less than the inside diameter of the casing, spacers of less thickness than that shown in the drawing may be used, and if the outside diameter of the shell and the inside diameter of the casing differ considerably, correspondingly thicker spacers may be used. The spacers are valuable also in that they prevent contact between the shell and the metal facing of the casing sections which contact may tend to produce an undesirable dissipation of heat from the shell. When the outer casing sections are assembled as shown in Fig. 2, the terminal studs 18 of the heating coils 17 may be connected by straps 23 in any desired combination. 24 indicates the connections of the heating coils 17 with a source of electrical energy not shown.

The inner casing which consists of the six sections 6 is constructed in a similar manner as the outer casing. Each section 6 has a curved bottom wall and side walls, the bottom wall comprising a sheet metal facing 27 and a lining 28 of heat insulating material, and the side walls comprising sheet metal facings 29 and 30, and linings 31 and 32. Baffles, corresponding to the baffles of the outer casing sections, are formed by sheet metal members 33 and 34 and linings 35 and 36. Arranged in the central zone of each inner casing section 6 and supported by the bottom wall thereof are four heating elements in the form of electric resistance coils 37 from which heat is transmitted to the welded joint by radiation. The ends of the coils are clamped to terminal studs 38 projecting through the bottom wall of the inner casing section 6 in order to facilitate the making of electrical connections.

The inner casing sections 6 are clamped together by means of flanges 39 and 40 and through bolts in a similar manner as the outer casing sections 5, and when assembled form a rigid structure of a given outside diameter, the latter being determined by the distance between diametrically opposed points on the outer edge of the ring formed by the circularly arranged side walls 29 or 30 of the casing sections 6. This outside diameter of the inner casing is preferably somewhat smaller than the inside diameter of the cylindrical shell to which the casing is to be applied, and spacers 41 and 42 of heat insulating material are provided to fill the gaps between the inner surface of the cylindrical shell and the side walls of the casing sections 6. By using spacers of different thickness an inner ring shaped casing of given outside diameter may be accommodated to cylindrical shells of different diameters as explained in connection with the outer casing. 25 and 26 indicate straps and electrical connections similar to the straps 23 and electrical connections 24 mentioned in connection with the outer casing.

A circumferential welded joint of the cylindrical shell 1 may be stress relieved by means of the apparatus described hereinbefore, as follows. The inner and outer ring shaped casings are applied to the shell as shown in the drawing, that is, the outer ring shaped casing is brought into such position that the central zone with the heating elements is directly above the joint, and similarly, the inner casing is brought into such position that the open side of the central zone with the heating elements faces the joint. In these positions the casings form, as will be seen, heat retaining hoods over the welded joint and the adjacent portions of the cylindrical shell sections which are circumferentially connected by the joint. All of the heating elements are then fed with electric current simultaneously so as to raise the temperature of the joint uniformly throughout its length. The heating process is continued until the joint and the metal adjacent thereto have been heated to a sufficiently high temperature for stress relieving which temperature may be about 1050° F. Thereafter the electric current is turned off, and the joint and the metal adjacent thereto are permitted to cool slowly while the heat retaining hoods formed by the casings are kept in place. After the temperature of the joint and the adjacent portions of the shell has sunk so far that it is safe to expose the joint to the open air the casings may be removed.

It should be noted that the heat insulating linings 15 and 16 restrict the transmission of heat from the heating coils 17 into the lateral compartments of the outer casing, and that the the heat insulating linings 35 and 36 likewise restrict the emission of heat from the heating coils 37 into the lateral compartments of the inner casing. The portions of the shell in which stresses, set up during the welding of the joint, may exist, lie between the baffles, and these are so spaced, transversely of the joint, that the widths of the central compartments of the casings are ample to accommodate those portions of the shell. The lateral compartments of the casings 5 and 6 are of substantial widths, transversely of the joint, and there are two zones on the shell, one between the baffles 15 and 35, and the other between the baffles 16 and 36, where the shell portion covered by the central compartments of the casings 5 and 6 merges with the shell portions covered by the lateral compartments of the casings 5 and 6. It is desirable that there be no sudden drop of temperature, transversely of the joint, in these merging zones and in this connection the following should be noted.

The spacing of the free ends of the heat insulating linings 15 and 16 from the outer surface of the shell, and the spacing of the free ends of the heat insulating linings 35 and 36 from the inner surface of the shell have the effect that, when the portion of the shell within the central compartment is brought up to a suitable stress relieving temperature, a certain amount of heat may pass from the central compartment into the lateral compartments, and while the portion of the shell in the central compartment is kept at stress relieving temperatures, the shell portions of the merging zones and the shell portions in the lateral compartments will be at temperatures gradually decreasing transversely of the joint. Any other suitable means for obtaining this effect or for making it more or less pronounced, may be used. The object aimed at is to avoid the arising of any harmful conditions in the portions of the shell adjacent to the portion from which stresses are to be relieved. The mentioned temperature distribution in the portions of the shell which are enclosed by the casings, is uniform longitudinally of the joint throughout the length of the joint, and will exist as long as the portion of the shell between the baffles is kept at a suitable temperature to effect complete relieving of stresses. During cooling, while the casings remain applied to the shell, the emission of heat from the portions of the shell within the casings is restricted, and these portions will, therefore, be cooled uniformly throughout the length of the joint.

The means for generating heat are here shown in the form of electric heating coils, but different means for heating the joint uniformly throughout its length may be employed. Instead of electric heating by radiation, as shown in the drawing, electric heating by induction (high frequency current) may be used. If it should be desired to heat by combustion the construction of the casings may be modified accordingly in order to provide an adequate supply of oxygen but still prevent a too rapid dissipation of heat during the cooling period.

It should also be noted that the construction of the casings in sections, particularly of the inner casing, offers advantages. For instance, if it is desired to stress relieve circumferential joints in a vessel which is closed at both ends, the sections of the inner casing may be brought into the vessel through a manhole or the like, assembled within the casing, and removed again after disassembly.

A modified construction of an apparatus according to the invention, for stress relieving longitudinal joints of a cylindrical plate metal structure, is shown in Fig. 4. The apparatus is constructed on the same principles as explained in connection with Figs. 1 to 3. It consists of an outer casing 43 and an inner casing 44, the interior space of each casing being divided by baffles 45 into a central zone, enclosing heating elements 46, and lateral zones intended to cover the portions of the plate metal structure adjacent to the joint, and to cause a gradual decrease of temperature from the heated joint to said adjacent portions. Spacing blocks 47 of heat insulating material are used for purposes of adjustment and for preventing metallic contact between the surface of the cylindrical structure and the side walls of the casings. Fig. 1 shows in dash-dotted lines the application of a furnace according to Fig. 4 to the longitudinal joint of a section of the cylindrical shell 1. It should be understood, however, that the longitudinal joints of a structure like the cylindrical shell 1 are preferably stress relieved before the sections are joined together by circumferential joints.

The furnace shown in Fig. 4 may also be modified for application to a welded joint between straight metal plates, in which case the outer and inner casings 43 and 44 would preferably take the form of square boxes having each one open side facing the plate metal.

It should be understood that it is not intended to limit the invention to the exact details of construction and procedure herein shown and described, for various modifications within the scope of the claims may occur to persons skilled in the art.

It is claimed and desired to secure by Letters Patent:

1. In an apparatus for locally heat treating a metal structure along a welded seam thereof, a casing adapted to form a heat retaining hood over said welded seam, extending the full length thereof, and means for heating said welded seam to a substantially uniform temperature throughout its length, the interior space of said casing being divided by partitions into a central zone adjacent to said welded seam, and lateral zones adjoining said central zone, to cause a gradual decrease of temperature from said heated seam to the adjacent portions of said metal structure.

2. In an apparatus for locally heat treating a metal structure along a welded seam thereof, a casing adapted to form a heat retaining hood over said welded seam, extending the full length thereof, the interior space of said casing being divided by partitions into a central zone adjacent to said welded seam, and lateral zones adjoining said central zone, and means within said central zone for heating said welded seam to a substantially uniform temperature throughout its length 3. In a furnace for stress relieving welded circumferential joints of plate metal vessels, a sectionalized casing adapted to form a heat retaining hood over said joint and extending the full length thereof, the interior space of said casing being divided by partitions into a central zone adjacent to said welded joint and lateral zones adjoining said central zone, means for connecting the sections of said casing, and means within said central zone for heating said welded joint to a substantially uniform temperature throughout its length.

4. In a furnace for stress relieving welded circumferential joints of a plate metal vessel, a casing adapted to form a heat retaining hood over said joint and extending the full length thereof, said casing having side walls substantially at right angles to the surface of said vessel, and partitions dividing the interior of said casing into a central zone, adjacent to the joint, and lateral zones adjacent to said central zone, spacing means between said side walls and the surface of said vessel, and means associated with said central zone for heating said welded joint to a substantially uniform temperature throughout its length.

5. In an apparatus for stress relieving a welded joint on a metal structure, a heat retaining casing adapted to cover an area on the structure coextensive in length with the joint and limited transversely thereto to portions adjacent to the joint, a source of heat within said casing adapted to heat the metal structure throughout the length of the joint while the latter and the adjacent portions of the metal structure are covered by said casing, and shielding members associated with said casing, providing therein a central zone about said source of heat and lateral zones adjoining said central zone, to cause a gradual decrease of temperature from said joint to the portions of the metal structure at the lateral edges of said covered area.

6. In an apparatus for stress relieving a welded joint on a metal structure, a casing adapted to cover an area on the structure coextensive in length with the joint and limited transversely thereto to portions adjacent to the joint, said casing having heat insulating side portions extending along the longitudinal edges of said area, and a heat insulating top portion connecting said side portions and extending throughout the length of the casing, and means within said casing for heating said joint to a substantially uniform temperature throughout its length.

7. In an apparatus for stress relieving a welded joint on a metal structure, a casing adapted to cover an area on the structure coextensive in length with the joint and limited transversely thereto to portions adjacent to the joint, said casing having heat insulating side portions extending along the longitudinal edges of said area, and a heat insulating top portion connecting said side portions and extending throughout the length of the casing, and means within said casing for heating said joint to a substantially uniform temperature throughout its length, said side portions being of substantial width transversely to the joint so as to afford zones of gradually decreasing heat intensity within said covered area along the longitudinal edges thereof.

8. An apparatus for stress relieving a welded joint on a metal structure, comprising a source of heat, a heat insulating enclosure for said source, having projecting portions adapted to concentrate the heat of said source upon the joint, side members at opposite sides of said enclosure, adapted to be supported, in the operative position of the apparatus on the metal structure, on portions of the latter at opposite sides of the joint, and means including said side members for retaining said enclosure in elevated position with respect to the metal structure so as to leave a space between the surface of the latter and said projecting portions of said enclosure.

9. An apparatus for stress relieving a welded joint on a metal structure, comprising a heat insulating member adapted to extend longitudinally of the joint throughout the length thereof and transversely of the joint over first portions of the structure adjacent to the joint at opposite sides of the latter, and therebeyond over second portions of the structure adjacent to said first portions thereof and merging therewith, and means associated with said member, whereby the joint and said first and second portions of the structure may be heated to elevated temperatures which are uniform longitudinally of the joint throughout the length of the joint, but of gradually decreasing height transversely of the joint in the merging zones of said first and second portions of the structure.

10. An apparatus for stress relieving a welded circumferential joint on a hollow plate metal structure, comprising a heat insulating member adapted to extend within the structure longitudinally of the joint throughout the length of the joint, and transversely of the joint over first interior portions of the structure adjacent to the joint at opposite sides thereof, and therebeyond over second interior portions of the structure adjacent to said first portions thereof and merging therewith, said member being divided into sections shorter, longitudinally of the joint, than the total length of the joint, means for detachably securing said sections together, means associated with said member including a series of heating elements forming a substantially continuous source of heat along said member throughout its length and arranged opposite a portion of said member intermediate the portions of the latter which are adapted to extend over said second portions of the structure, whereby the joint and said first and second portions of the structure may be heated to elevated temperatures which are uniform longitudinally of the joint throughout the length of the joint, but of gradually decreasing height transversely of the joint in the merging zones of said first and second portions of the structure, and means for detachably connecting said heating elements together.

11. An apparatus for stress relieving a welded circumferential joint on a hollow plate metal structure, comprising a heat insulating member adapted to extend within the structure longitudinally of the joint throughout the length of the joint, and transversely of the joint over first portions of the structure adjacent to the joint at opposite sides thereof, and therebeyond over second portions of the structure adjacent to said first portions thereof and merging therewith, said member being divided into sections shorter, longitudinally of the joint, than the total length of the joint, means for detachably securing said sections together, and means associated with said member, whereby the joint and said first and second portions of the structure may be heated to elevated temperatures which are uniform longitudinally of the joint throughout the length of the joint, but of gradually decreasing height transversely of the joint in the merging zones of said first and second portions of the structure, said means including a series of heating elements forming a substantially continuous source of heat along said member throughout its length and arranged opposite a portion of said member intermediate the portions of the latter which are adapted to extend over said second portions of the structure, means for detachably connecting said heating elements together, heat insulating portions extending longitudinally of said member throughout its length at opposite sides of said heating elements, and means for retaining said heat insulating portions in spaced relation to the interior surface of said hollow structure.

12. An apparatus for stress relieving a welded joint on a plate metal structure, comprising a first and a second heat insulating member, respectively adapted to extend, at opposite sides of the plate material of the structure, longitudinally of the joint throughout the length of the joint and transversely of the joint over first portions of the structure adjacent to the joint at opposite sides thereof, and therebeyond over second portions of the structure adjacent to said first portions thereof and merging therewith, means associated with said first member and means associated with said second member, by each of which means the joint and said first and second portions of the structure may be heated to elevated temperatures which are uniform longitudinally of the joint throughout the length of the joint but of gradually decreasing height transversely of the joint in the merging zones of the said first and second portions of the structure.

13. An apparatus for stress relieving a welded joint on a plate metal structure, comprising a first and a second heat insulating member respectively adapted to extend, at opposite sides of the plate material of the structure, longitudinally of the joint throughout the length of the joint and transversely of the joint over first portions of the structure adjacent to the joint at opposite sides thereof, and therebeyond over second portions of the structure adjacent to said first portions thereof and merging therewith, heating elements forming a substantially continuous source of heat along said first heat insulating member throughout its length and arranged opposite a portion of said first member intermediate the portions thereof which are adapted to extend over said second portions of the structure, and heating elements forming a substantially continuous source of heat along said second heat insulating member throughout its length and arranged opposite a portion of said second member intermediate the portions thereof which are adapted to extend over said second portions of the structure, whereby the joint and said first and second portions of the structure may be heated to elevated temperatures which are uniform longitudinally of the joint throughout the length of the joint, but of gradually decreasing height transversely of the joint in the merging zones of said first and second portions of the structure.

14. An apparatus for stress relieving a welded joint on a metal structure, comprising a heat insulating member adapted to extend longitudinally of the joint throughout the length of the joint and transversely of the joint over first portions of the structure adjacent to the joint at opposite sides thereof, and therebeyond over second portions of the structure adjacent to said first portions thereof and merging therewith, and heating elements forming a substantially continuous source of heat along said member throughout its length, and arranged opposite a portion of said member intermediate the portions of the latter which are adapted to extend over said second portions of the structure, whereby the joint and said first and second portions of the structure may be heated to elevated temperatures which are uniform longitudinally of the joint throughout the length of the joint but of gradually decreasing height transversely of the joint in the merging zones of said first and second portions of the structure.

15. An apparatus for stress relieving a welded joint on a metal structure, comprising a heat insulating member adapted to extend longitudinally of the joint throughout the length thereof and transversely of the joint over first portions of the structure adjacent to the joint at opposite sides thereof, and therebeyond over second portions of the structure adjacent to said first portions thereof and merging therewith, heating elements forming a substantially continuous source of heat along said member throughout its length and arranged opposite a portion of said member intermediate the portions of the latter which are adapted to extend over said second portions of the structure, heat insulating portions extending longitudinally of said member throughout its length at opposite sides of said heating elements, and means for retaining said heat insulating portions in spaced relation to said structure, whereby the joint and said first and second portions of the structure may be heated to elevated temperatures which are uniform longitudinally of the joint throughout the length of the joint, but of gradually decreasing height transversely of the joint in the merging zones of said first and second portions of the structure.

RAY C. NEWHOUSE.